United States Patent
Lim et al.

(10) Patent No.: US 10,164,220 B1
(45) Date of Patent: Dec. 25, 2018

(54) GRAPHENE-BASED BATTERY PACKAGING

(71) Applicant: Amazon Technologies, Inc., Reno, NV (US)

(72) Inventors: James Robert Lim, San Jose, CA (US); Poon-Keong Ang, Cupertino, CA (US); Christopher Thomas Li, Mountain View, CA (US); Yuting Yeh, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 620 days.

(21) Appl. No.: 14/340,236

(22) Filed: Jul. 24, 2014

(51) Int. Cl.
*H01M 2/02* (2006.01)
*G06F 1/18* (2006.01)

(52) U.S. Cl.
CPC .......... *H01M 2/0287* (2013.01); *G06F 1/181* (2013.01); *H01M 2/026* (2013.01); *H01M 2002/0297* (2013.01); *H01M 2220/30* (2013.01)

(58) Field of Classification Search
CPC .......................... H01M 2/0287; H01M 2/029
USPC .................................................. 429/121–347
See application file for complete search history.

(56) References Cited

U.S. PATENT DOCUMENTS

| 7,112,389 | B1 | 9/2006 | Arora et al. | |
|---|---|---|---|---|
| 2007/0188131 | A1* | 8/2007 | Guthrie | H01M 10/425 320/112 |
| 2011/0267740 | A1* | 11/2011 | Jayaraman | H01G 9/016 361/502 |
| 2014/0315083 | A1* | 10/2014 | Liu | H01M 4/366 429/217 |

FOREIGN PATENT DOCUMENTS

| WO | WO 2012/151880 | * 11/2012 | .............. H01M 4/13 |
|---|---|---|---|
| WO | 2013074710 | 5/2013 | |
| WO | 2014055802 | 4/2014 | |

\* cited by examiner

*Primary Examiner* — James Lee
(74) *Attorney, Agent, or Firm* — Eversheds Sutherland (US) LLP

(57) ABSTRACT

Aspects of the disclosure relate to graphene-based battery packaging. In one aspect, the graphene-based battery packaging can include an assembly of translucent members, including a thin graphene-based member which can be embodied or can comprise a film of graphene layers, a film of graphene oxide, or a combination thereof. In another aspect, the graphene-based member can be assembled to form an interlayer between two of the translucent members in the assembly. In certain aspects, each of the two translucent members can be embodied in or can include a thermoplastic material. In another aspect, at least one of the translucent members in the assembly can be doped with aggregates that provide a predetermined color to the assembly. In one aspect, the graphene-based member can provide substantive isolation between translucent members separated thereby, thus mitigating diffusion of atoms, molecules, and/or particulates between such members.

20 Claims, 8 Drawing Sheets

GRAPHENE-BASED BATTERY PACKAGING

BACKGROUND

Graphene has a number of unique physicochemical properties, such as thin monolayers (e.g., 0.07 nm to 0.09 nm per layer), flexible, nearly transparent or translucent, high mechanical strength, and good thermal conductivity when compared to traditional thermal conductors. Graphene also exhibits ultrabarrier properties.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
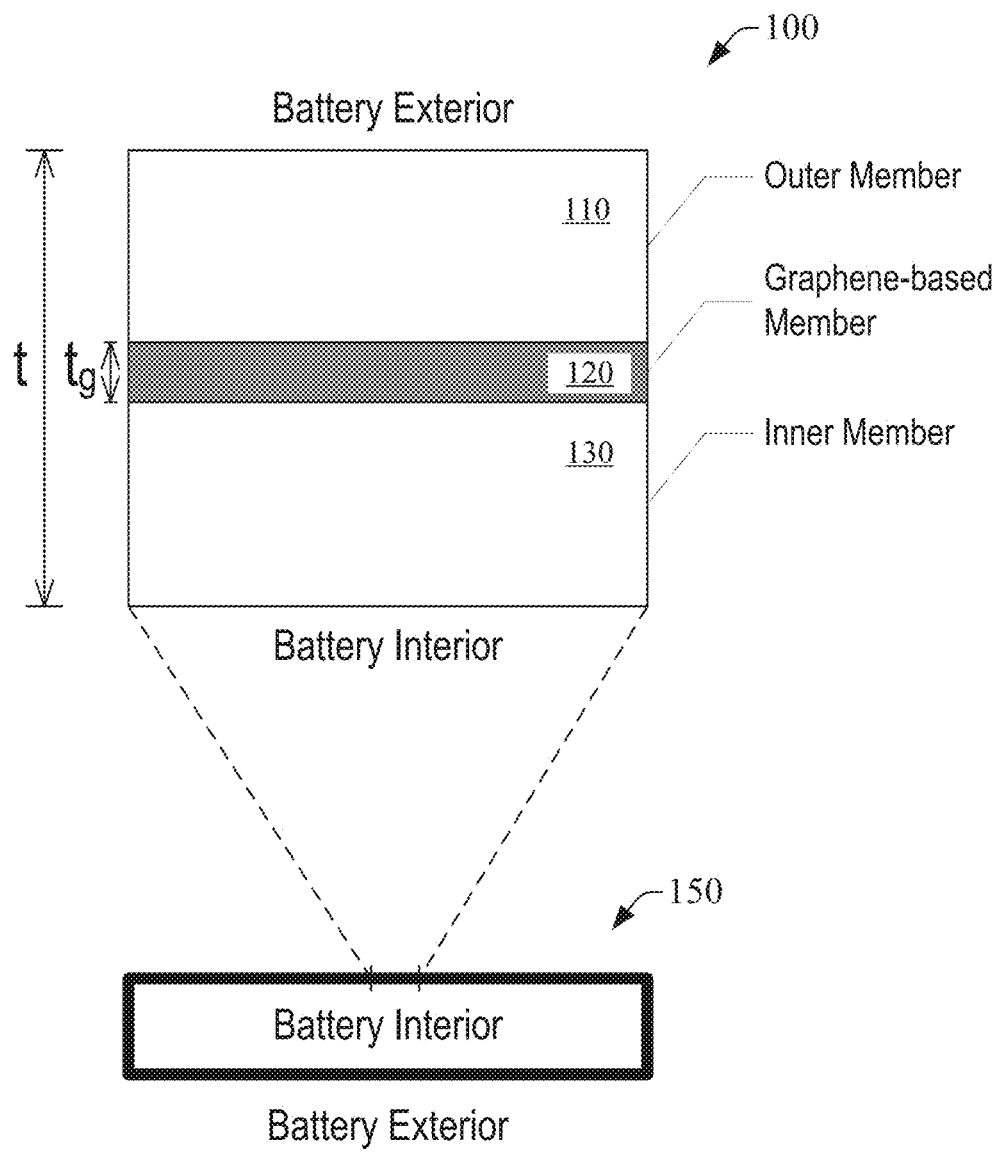
FIG. 1 illustrates a cross-section of an example battery packaging material in accordance with one or more aspects of the disclosure.

The disclosure recognizes and addresses, in at least certain aspects, the functionality of solid-state packaging materials. Accordingly, in one aspect, the disclosure provides a graphene-based packaging material, which can be utilized, among other things, for battery packaging. To at least such end, in one aspect, the graphene-based packaging material can be flexible and can comprise an assembly of translucent members, including a thin graphene-based member which can be embodied or can comprise a stack of graphene layers, a stack of one or more layers of graphene oxide, or a combination thereof. Such stacks also may be referred to as sheets or films. In certain aspects, the graphene-based member can have a uniform or substantially uniform thickness in the range from about one atomic level graphene layer to about 100 atomic level graphene layers. A uniform thickness refers to a thickness that is independent of the position at which the thickness is determined or otherwise probed. A thickness in such a range can render the graphene-based member translucent. In one aspect, without intending to be bound by theory and/or modeling, the translucency of the graphene-based member may be independent of position within the graphene-based member due to the uniform thickness thereof. In another aspect, the graphene-based member can be assembled to form respective interfaces with translucent members in the assembly. As such, the graphene-based member can provide substantial chemical and/or mass-transport isolation between such translucent members. In addition, the overall solid structure for packaging can be translucent. The translucent members in the assembly can be formed from translucent thermoplastic materials (polypropylene, polyethylene, polyurethane, polyethylene terephthalate, etc.), copolymers, and composites thereof. In addition, at least one of the translucent members can form a composite with aggregates that can absorb visible light, for translucent coloration, for example, and/or absorb light in the ultraviolet portion of the electromagnetic spectrum and/or aggregates embodied in or comprising photochromic and/or thermochromic materials.

In view of at least the features described herein, it can be appreciated that, in at least certain aspects, the graphene-based packaging material in accordance with aspects of the disclosure can be referred to as "graphene-based packaging assemblies," and can be applied or otherwise leveraged in packaging scenarios other than battery packaging. In connection with battery packaging, the solid structures of the disclosure can provide translucent structures that can afford thinner battery packaging materials, and thus, improved battery energy densities and form factors. In addition, the translucent structures can provide visibility into the interior of a battery, which can permit assessing, at least qualitatively, the state-of-health of the battery. Such visibility also can provide a visually appealing battery assembly, especially in embedded-battery scenarios in which a housing of a device utilizing the battery is transparent. As described in greater detail hereinafter, in certain embodiments, the disclosed solid structures for battery packaging and other types of packaging can have various morphologies and can be formed via various treatments of one or more solid media, including flexible polymeric solids.

FIG. 1 illustrates an example of a solid structure 100 that constitutes a graphene-based packaging material in accordance with one or more aspects of the disclosure. As illustrated, the graphene-based packaging material (represented with a thick line in diagram 150 in FIG. 1) can be embodied in a flexible solid material that can contain the elements of a battery, wherein the elements can include an electrolyte, one or more electrodes, and/or a separator or a portion thereof. In certain embodiments the battery can be contained or otherwise embedded within an electronic device (such as consumer electronics equipment). In other embodiments, the battery can be exposed to atmosphere, and thus, it can be more readily exposed to oxygen, water, and other particulate material that can deteriorate the battery performance should those elements ingress into the battery. As such, as illustrated in the schematic cross-section diagram 150 representing the battery, the graphene-based packaging material of the disclosure can separate the interior from the exterior of the battery. Therefore, an inner surface of the graphene-packaging material can be in contact with the battery interior, and an outer surface of the graphene-packaging material can be in contact with the environment surrounding the battery. As described in greater detail below, the graphene-based packaging material can be formed to mitigate exchange of oxygen, moisture, and/or other particulates between the battery exterior and the battery interior.

In addition, as described in greater detail herein, the graphene-based packaging material can be formed to be translucent.

As illustrated in FIG. 1, the solid structure 100 can include an outer member 110, a graphene-based member 120, and an inner member 130. The outer member 110 disposed to be in contact with the exterior of a battery via a first surface. The outer member 110 also can include a second surface opposing the first surface, where the second opposing surface is in contact with a first surface of a graphene-based member 120. In addition, the graphene-based member 120 can include a second opposing surface that is contact with the inner member 130. Accordingly, the inner member 130 can have a first surface in contact with the second opposing surface of the graphene-based member 120. In addition, the inner member 130 can be disposed to be in contact with the battery interior (e.g., an electrolyte) via a second opposing surface.

In certain embodiments, the outer member 110 and the inner member 130 can be embodied or can include translucent thermoplastic materials, such as polypropylene, polyethylene, polyurethane, polyethylene terephthalate, and the like. The outer member 110 and/or the inner member 130 can be mechanically strong (e.g., high strength, high hardness, and/or high toughness), flexible, and/or chemically resistant, which can provide mechanical stability and/or handling resilience to the graphene-based battery packaging materials described herein. It should be appreciated that, in one aspect, based at least on melting point and/or mechanical strength, different thermoplastic materials may be selected to form the outer member 110 and the inner member 130. Mechanical strength refers to the capacity of a material to withstand a load and can include, for example, yield strength, compressive strength, tensile strength, fatigue strength, impact strength, or a combination thereof more specifically, in certain embodiments, thermoplastic materials having a higher melting temperature and a higher mechanical strength (e.g., higher abrasive resistance) may be employed to form the outer member 110, whereas thermoplastic materials having a lower melting temperature, a lower mechanical strength, and/or a lower chemical resistance may be employed to form the inner member 130. For example, the outer member 110 (e.g., a first translucent thermoplastic film) can have a first melting point and a first mechanical strength, and the inner member 130 (e.g., a second translucent thermoplastic film) can have a second melting point and a second mechanical strength, where the first melting point is higher than the second melting point, and the first mechanical strength is higher than the second mechanical strength. For another example, the inner member 130 can be formed from polypropylene (which is ultraviolet or UV-susceptible), allowing impulse sealing (via heat and pressure, for example) of the graphene-based battery packaging material when folded or otherwise placed over adjacent polypropylene sheets or other thermoplastic materials whereupon the interfaces can form a hermetic seal.

In a scenario in which a battery is packaged with the graphene-based packaging material as described herein, without intending to be bound by theory and/or modeling, design criteria for constituent materials adequate to form the inner member 130 can contemplate the fact the such a member may be in contact with electrolyte. In addition or in the alternative, the design criteria also can contemplate the fact that the inner member 130 may need to be suitable for forming a hermetic seal when folded onto itself (see, e.g., FIG. 7 described hereinafter). In one aspect, such a hermetic seal can be embodied in an edge seal having thicknesses along the directions transversal to the edge formed by the seal of the order of about 1 mm to about 6 mm. In one aspect, the edge seal can provide diffusion barrier properties along such transversal directions by incorporating a relatively high activation energy. Without intending to be bound by theory and/or modeling, the activation energy refers herein to the energy excess that needs to be provided to a particle (e.g., an oxygen atom, an oxygen molecule, a water molecule, or the like) in order for the particle to be injected into the edge seal, and subsequently propagated along the seal into a sealed region (e.g., the interior of the battery). In another aspect, at least the thickness of the edge seal can prevent the ingress of one or more elements (e.g., water and/or oxygen) from the exterior into the interior of the battery that is being packaged. In one example, the inner member 130 can be embodied in or can include polyolefin or poly(methyl methacrylate).

In other embodiments, the outer member 110 can be embodied in or can comprise one or more of plastic layers, thin acrylic and vinyl (PVC) plastic films, polyester, biaxially-oriented polyethylene terephthalate, biaxially-oriented polypropylene, polyether ether ketone (PEEK). Such materials can include, as described herein, additives that can absorb light in the ultra-violet (UV) portion of the electromagnetic spectrum. Such additives can include benzotriazole, hydroxyphenyltriazine, combinations thereof, derivatives thereof, or the like. In yet other embodiments, the outer member 110 and/or the inner member 130 can be embodied in or can include copolymers and/or composites thereof.

In general, it should be appreciated that while the outer member 110 (e.g., an aliphatic polyamide sheet or film) can have reasonable oxygen, water, and/or particulate barrier properties, such a member can be utilized as a protective layer against abrasion (e.g., scratches), punctures, tears, and/or other mechanical strain/stress to which the graphene-based battery packaging may be submitted. In addition, the outer member 110 can be utilized as a printable surface for labeling and/or other marking of the battery associated with the battery packaging material.

As described herein, the example solid structure 100 includes a graphene-based member 120. In certain embodiments, the graphene-based member 120 can be embodied in or can include a graphene sheet or film, a graphene oxide sheet or film, or a combination (such as a solid mixture or composite) of graphene and graphene oxide forming a sheet or film. It should be appreciated that, in certain embodiments, the graphene film and/or the graphene oxide film may be combined with or replaced by a thin metal layer (such as a titanium layer having a thickness of about 10 Å to about 100 Å) or other oxygen getter materials. In one aspect, the atomic lattice structure and electronic structure of graphene-based member 120 can provide substantial chemical isolation and/or mass transport isolation between the outer member 110 and the inner member 130. More specifically, without intending to be bound by theory and/or modeling, such isolation properties may arise from densely delocalized electrons from $\pi$-orbitals present in graphene layers, which may repulsively block the passage of atoms (e.g., hydrogen), molecules (e.g., helium molecules or water molecules), and/or particulates. As such, in one aspect, the graphene-based member 120 may be referred to herein as an "ultrabarrier."

Figure 2:
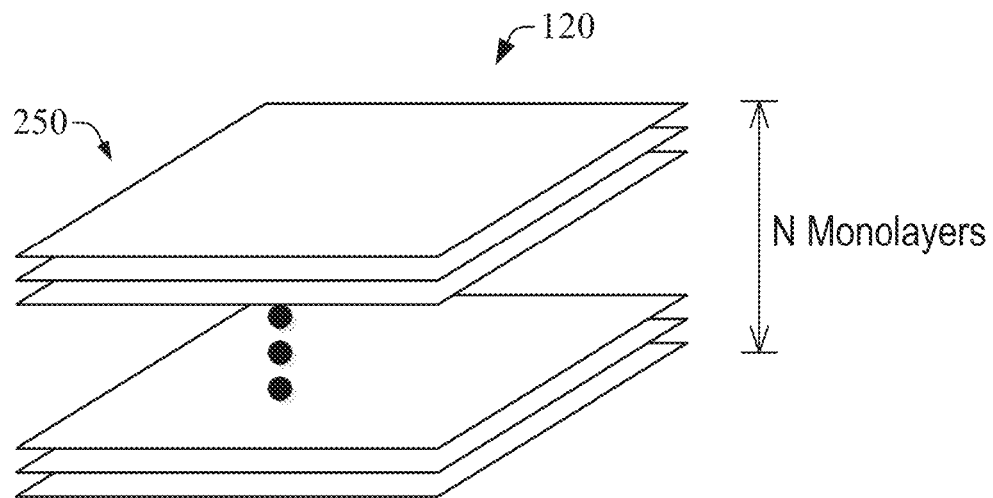
FIG. 2 illustrates an example of the structure of an intermediate sheet of the battery packaging material illustrated in FIG. 1.

As illustrated in FIG. 2, in certain embodiments, the graphene-based member 120 can be embodied in or can include a sheet or film having one or more atomic monolayers 250 of graphene. The number of such monolayers may be bound to not exceed about 100 monolayers, which can permit such a sheet or film of graphene to be translucent.

Translucency in accordance with aspects of this disclosure may be defined in terms of transparency of the graphene-based member 120 in the visible portion of the spectrum of electromagnetic radiation—e.g., wavelengths in the range from about 400 nm to about 800 nm. More particularly, in one example, translucency may be defined as optical transmittance in the range from about 10% transmittance to about 90% transmittance. As such, the graphene-based member 120 can be referred to as a translucent graphene-based member 120 in scenarios in which such a member's thickness permits optical transmittance in the stated range in the visible portion of the spectrum of electromagnetic radiation. In addition, in certain embodiments, the translucency of the graphene-based member 120 can be independent of position within a plane that is contained in the graphene-based member 120 and that is normal to the stacking direction of the one or more atomic monolayers 250. In contrast, it should be appreciated that typical battery packaging materials can include a relatively thick aluminum interlayer, that typically is opaque and functions mainly as a barrier film that may prevent oxygen and/or moisture ingress (via diffusion, for example) into the interior of the packaged battery.

In addition, the example solid structure 100 can be referred to as translucent in scenarios in which the assembly of members 110, 120, and 130 has an optical transmittance in the range from about 10% transmittance to about 90% in the visible portion of the electromagnetic spectrum. Accordingly, in at least certain embodiments, the example solid structure 100 can be translucent. As such, a translucent solid structure 200 can permit a qualitative or semi-quantitative analysis of the conditions (e.g., operational conditions or otherwise) of a battery packaged with a graphene-based packaging material including such a structure. For example, the translucency can permit observing changes in coloration (e.g., leaching) in the battery packaging and/or within internal regions of the battery. Such changes can qualitatively convey degradation of the battery or an element thereof (e.g., a cathode, an anode, an electrolyte). In addition, based on the spatial extent of the changes in coloration, for example, the degradation of the battery can be characterized semi-quantitatively. For instance, an estimate of the spatial extent of area that presents a change in coloration can provide an estimate of the amount of material within the battery and/or the graphene-based battery packaging that may be degraded. Further, certain coloration of the graphene-based battery packaging and/or an internal region of the battery can reveal that the battery may have been submitted to a certain temperature outside a normal or otherwise intended range of operation temperatures. For another example, the translucency of the graphene-based battery packaging of this disclosure can permit observing the presence of gas within the battery, such as bubbles formed in the battery interior. For yet another example, the translucency of the graphene-based battery packaging of this disclosure can permit observing the presence of corrosion in the battery or, more generally, observing uniform (e.g., position independent) or non-uniform morphological changes (e.g., shape deformations, increased porosity, or the like) in the graphene-based battery packaging or in the interior of the battery. An estimate of the extent of a corroded region or the extent of a region presenting morphological changes can provide an estimate of the amount of degraded material within the battery and/or the graphene-based battery packaging.

Figure 3:
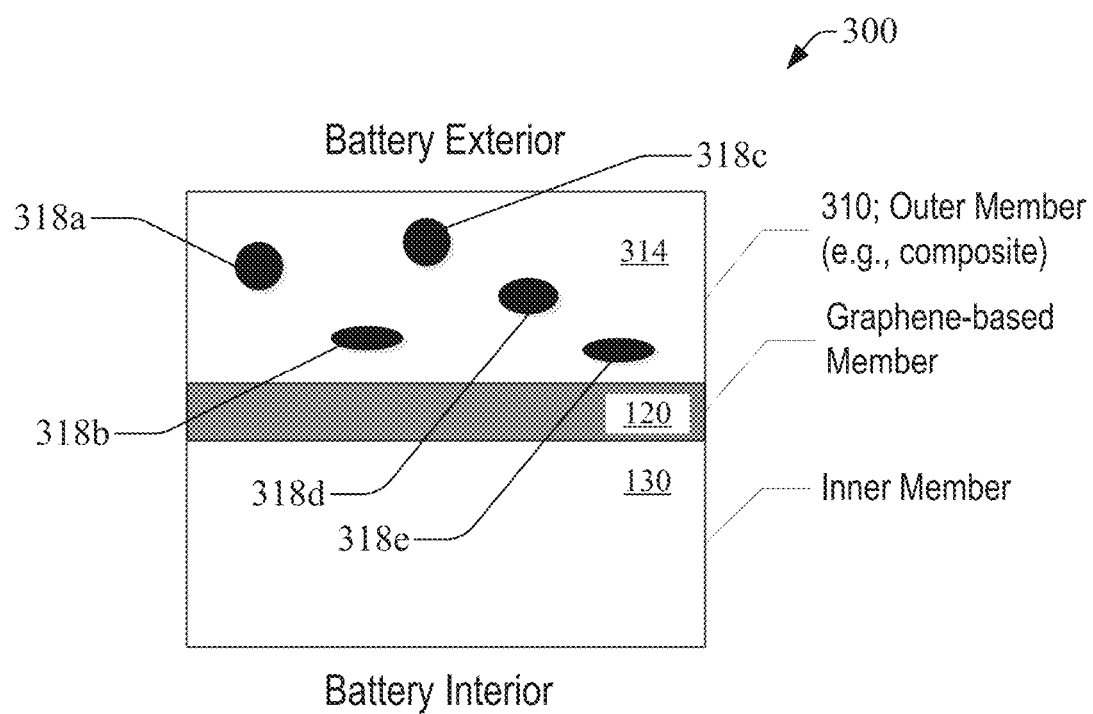
FIG. 3 illustrates a cross-section of another example of a solid structure for packaging in accordance with one or more aspects of the disclosure.

Numerous variations to the design of the solid structure 200 can be implemented in order to adjust functionality thereof, such as responsiveness to electromagnetic radiation in the ultraviolet (UV) portion of the electromagnetic radiation spectrum. FIG. 3 illustrates an example of a graphene-based packaging material having a solid structure 300 an outer member 310 formed from a composite material in accordance with one or more aspects of the disclosure. The example solid material 300 also can include a graphene-based member 120 (e.g., a graphene sheet, graphene oxide sheet, or a sheet of a graphene/graphene-oxide composite), and the inner member 130 that may be in contact with the interior of a battery contained by graphene-based packaging material having the example solid structure 300. In certain embodiments, the outer member 310 can be formed from a composite material comprising a polymer matrix 314, such as an aliphatic polyamide matrix, and an aggregate (represented with schematic insertions 318a-318e in FIG. 3) embodied in or including passive UV-blocking (or UV-absorbing) materials. The aggregate can permit adjusting the coloration (or perceived color) of the outer member 310 and thus, the example packaging material 300. For example, the aggregate can render the outer member 310 amber colored. The aggregate can be formed from or can include one or more materials, such as silica particles (including cerium-doped silica particles, neodymium-doped silica particles), tin oxide nanoparticles, zinc oxide nanoparticle, titanium dioxide nanoparticles, other metal oxide nanoparticles; and/or other UV-absorbing dopants, such as or translucent amber coloration materials including iron oxide ($Fe_2O_3$), sulfur (S), and carbon (C).

In other embodiments, the aggregate (see, e.g., schematic insertions 318a-318e in FIG. 3) can be formed from or can include active UV-blocking materials based on photochromic materials, such as transition metal oxides (e.g., $MoO_3$, $WO_3$, $V_2O_5$), and/or particles including quinones, spiropyrans, spirooxazines, nitrones, stilbenes, triarylmethanes, and/or inorganic compounds, such as silver and zinc halides within glass nanoparticles. In certain embodiments, nanoparticles of exhibiting photochromaticity can be coated with additional barrier in order to reduce leaching.

It should be appreciated that even in the presence of photo bleaching, the aggregate in the outer member 310 can permit at least a qualitative assessment of overall light/UV exposure of the packaging material 300 while maintaining a translucent appearance of a package formed from the packaging material 300. More specifically, yet not exclusively, the spatial extent of changes in coloration (e.g., photo bleaching) of the packaging material 300 and/or the type of such changes (e.g., location or distributed) can qualitatively and/or semi-quantitatively characterize the exposure to light (UV or otherwise). In other embodiments, the aggregate can be formed from or can include thermochromic materials, such as nickel sulfate, vanadium dioxide, zinc oxide, titanium oxide, indium oxide, other metal oxides or transition metal oxides, and/or dyes (e.g., spirolactones, fluorans, spiropyrans, fulgides, and the like) that can modify the optical properties of the packaging material 300 in response to changes in temperature.

As described herein, the thicknesses of the graphene-based member 120, the outer member 310, and the inner member 130, as well as the specific material forming the inner member 130 and/or the outer member 310 can be adjusted in order to balance translucency and functionality for protecting the packaged environment (e.g., a battery, a foodstuff package, a medicine package, or the like) from punctures, tears, abrasion, and/or isolating the packaged environment from oxygen, water, particulates, and/or other chemical elements that may be detrimental thereto. In addition, adjustments to the outer member 310 may be implemented to provide a suitable printable or otherwise treatable surface for labeling the packaged environment.

Figure 4A:
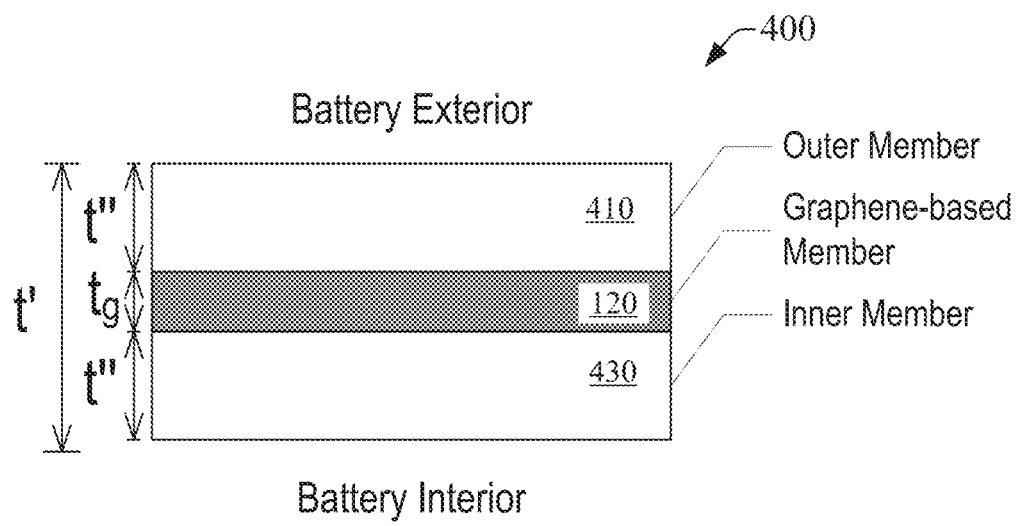
FIGS. 4A-4B illustrate other examples of solid structure for packaging in accordance with one or more aspects of the disclosure.
Figure 4B:
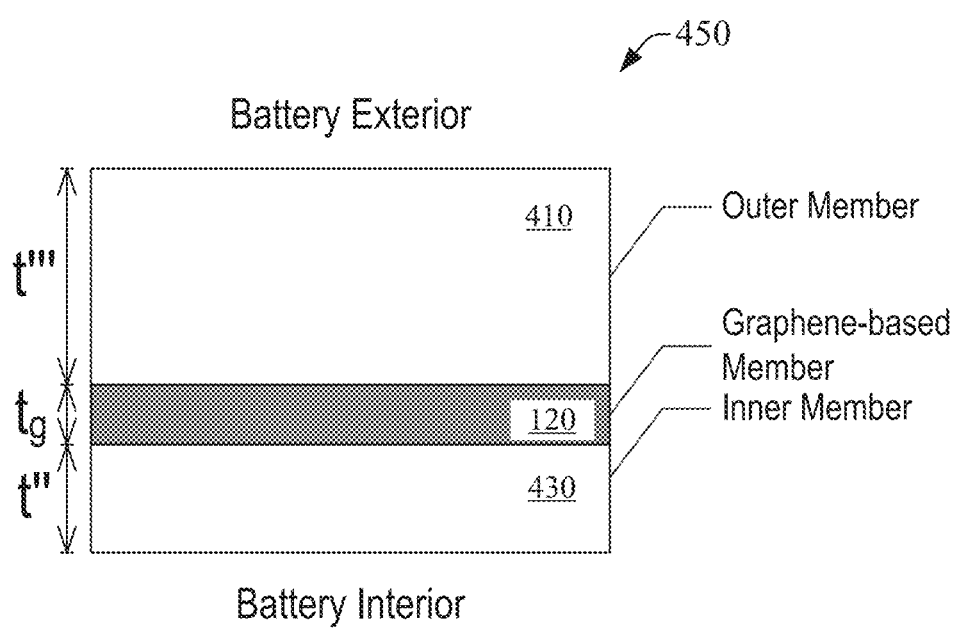

The graphene-based member 120 (e.g., a graphene sheet, graphene oxide sheet, or a sheet of a graphene/graphene-oxide composite) can permit tailoring or otherwise adjusting a solid structure in accordance with this disclosure to specific packaging and/or manufacturing objectives. More specifically, yet not exclusively, as illustrated in FIG. 4A, the reduced thickness of the graphene member 120 with respect to a typical Al layer present in common battery packaging materials can reduce the overall thickness t' of the solid packaging structure 400 with respect to the overall thickness of the typical trilaminate materials for battery packaging. In scenarios in which the example solid packaging structure 400 is employed for battery packaging, the reduced thickness of a packaging structure formed by the example solid structure 400 can improve overall battery energy density. For instance, without intending to be limited by modeling and/or design considerations, the overall thickness $2t''+t_g$ of the packaging solid structure 400 can be about 50 μm plus the thickness $t_g$ of the graphene-based member 120. As described herein, the thickness $t_g$ of the graphene-based member 120 can range from about 1 Å to about 400 Å. Accordingly, the overall thickness of the packaging solid structure 400 can be substantially thinner than the typical thickness of about 100 μm of typical battery packaging materials. In addition or in the alternative, as illustrated in FIG. 4B, in a second solid packaging structure 450, the thickness t''' (e.g., about 75 μm) of the outer member 410 can be made greater than the thickness of the graphene member 120 and the inner member 430. Accordingly, the example solid packaging structure 450 can have increased mechanical robustness when compared to a packaging structure having a thinner outer member 410. As such, for example, the solid packaging structure 450 may be more resistant to puncturing and/or other handling events than the typical battery packaging material 100. In addition, the overall thickness of the solid packaging structure 450 can comparable to the thickness of a typical battery packaging material, with increased mechanical robustness.

It should be appreciated that while the outer member 410 is illustrated as a non-composite, in certain embodiments, the outer member 410 can be embodied in or can include a composite material that can include an aggregate in accordance with aspects of this disclosure, such as one or more of a colored (e.g., amber-colored) UV-blocking material, a non-colored UV-blocking material, a photochromic material, or a thermochromic material.

As described herein, the outer member 410 and the inner member 430 can be embodied in translucent materials (such as translucent thermoplastics and/or polymers), and in view of the translucency of the graphene-based member 120, the example packaging materials 400 and 450 can be translucent. In one aspect, the translucency of the graphene-based member 120 can be independent of position within the graphene-based member 120, and thus, the translucency may be referred to as uniform translucency. In addition, while the thickness of the inner member 430 remains substantially the same in the example graphene-based packaging materials 400 and 450, it should be appreciated that such a thickness also can be adjusted based on certain material requirements to form a suitable hermetic seal and/or specific characteristics (e.g., pH level) of the interior environment that may be contained by such packaging materials. Therefore, for example, by adjusting the thickness of the inner member 430, a specific type of seal can be achieved and/or a battery package formed from the graphene-based packaging materials 400 and 450 can be customized to the type of battery that is packaged.

Figure 5:
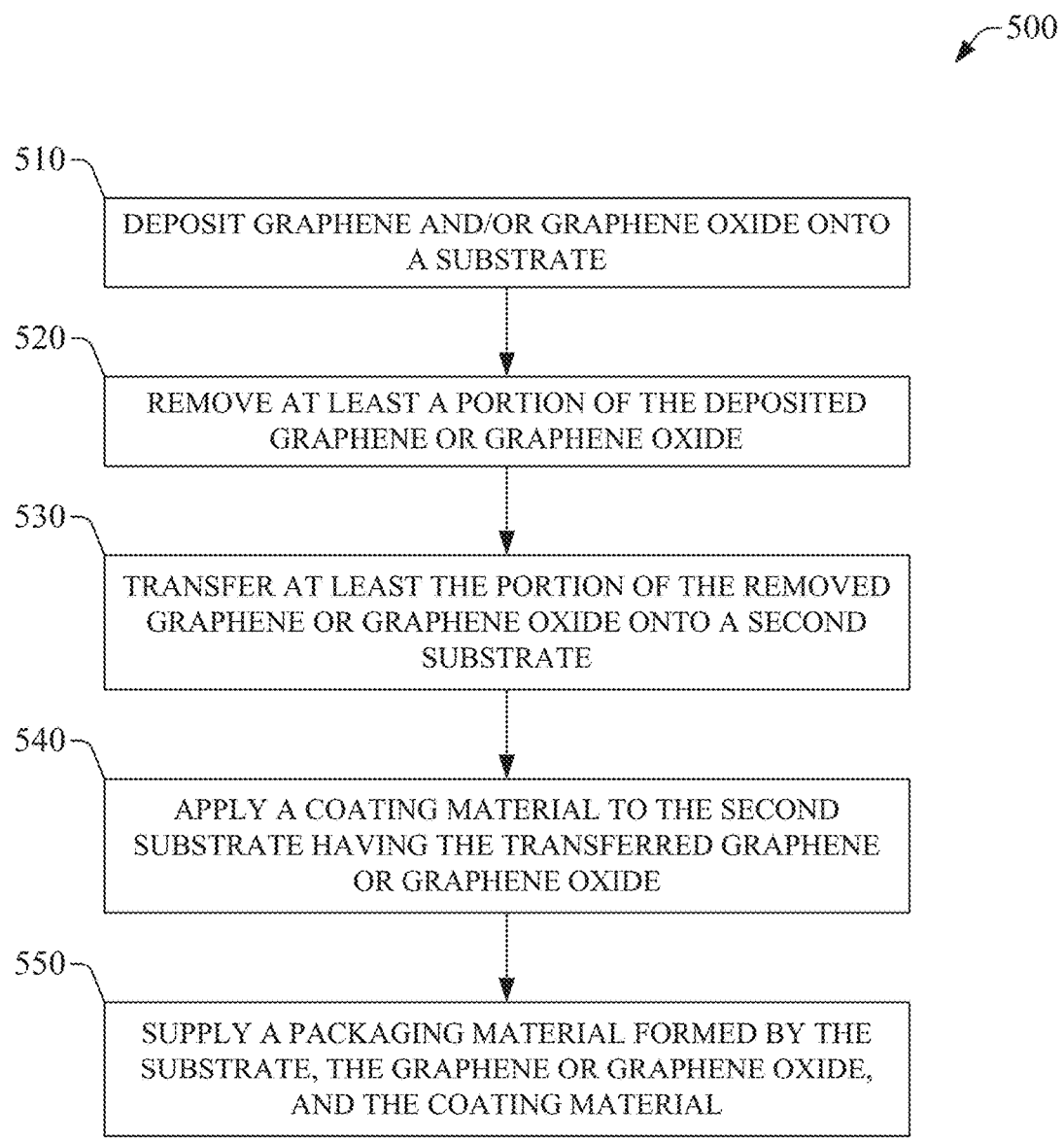
FIGS. 5-6 illustrate examples of processes for forming solid structures for packaging in accordance with one or more aspects of the disclosure.

Numerous techniques may be implemented in order to manufacture the packaging assemblies, or solid structures for packaging, in accordance with aspects of this disclosure. In view of the aspects described herein, an example process 500 for providing such packaging assemblies according to one or more aspects of the disclosure is illustrated in FIG. 5. The example process 500 includes block 510 at which an amount of graphene and/or graphene oxide may be deposited onto a substrate 514. The graphene can be deposited in a film having one or more atomic layers. Similarly, the graphene oxide can be deposited as a sheet, or film, having one or more layers of graphene oxide. The substrate may be a solid semiconductor substrate (such as a silicon wafer or a germanium wafer), a metal substrate, or a substrate treated with a metal (such as copper). In certain embodiments, the graphene can be deposited onto the substrate via chemical vapor deposition (CVD) or epitaxial growth (such as the growth accomplished via molecular beam epitaxy (MBE)). In other embodiments, deposition of graphene oxide can include deposition of graphite via liquid-carrier deposition or other deposition approaches, where at least a portion of the graphite can be converted into graphene oxide via chemical and/or thermal treatment in an oxygen rich atmosphere. In yet other embodiments, layers of graphite—which may be obtained via exfoliation or other layer separation process(es)—also can deposited onto the substrate 514, and can be oxided in order to produce one or more layers of graphene oxide. In still other embodiments, a sheet of graphene oxide deposited onto the substrate may be reduced to substantially graphene. It should be appreciated that reducing the graphene oxide can introduce defects (e.g., vacancies) in the graphene layers that may be so produced. Without intending to be bound by processing techniques, it should be appreciated that such defective graphene layers may be overlapped at a later stage in order to produce a thicker sheet of graphene in which substantially-defect-free graphene layers may cover or otherwise seal any defects in order to retain hermetic integrity, for example.

In one implementation, after the deposition block 510, at least a portion of the deposited graphene layers and/or at least a portion of the graphene oxide layers can be removed from the substrate. The deposited graphene layers or a portion thereof, and/or the deposited graphene oxide layers or a portion thereof can be removed from the substrate via one or more of exfoliation, sonication, or slicing. It should be appreciated that substantially any wafer processing technique may be applied to remove or otherwise extract graphene or graphene oxide sheets from the substrate.

At block 530, at least a portion of the removed graphene sheets (e.g., a group of atomic monolayers and/or multilayers) and/or graphene oxide may be transferred onto a second substrate. The second substrate may be formed from a material suitable for forming an inner member (e.g., inner member 130) or an outer member (e.g., outer member 110) of a packaging material in accordance with aspects of the present disclosure. As such, the material can be embodied in a translucent thermoplastic, a polymer sheet, or the like.

In certain embodiments, the removal block 520 may be optionally bypassed, and the transfer block 530 may include stamping onto the second substrate the graphene sheets or the graphene oxide sheets deposited at block 510. In one embodiment, the stamping can be performed in a roll-to-roll process, in a predefined packaging outline or in a size larger than the predefined packaging outline. As such, prior to the stamping, the second substrate may be suitably masked according to such an outline. Stamping the graphene sheets or the graphene oxide sheets onto the second substrate can effectively laminate a graphene-based member (e.g., graphene-member 120) onto the second substrate. The roll-to-roll process can permit large-scale lamination of the graphene-based member, and subsequent processing of the laminated substrate. As utilized in the present disclosure, the packaging outline refers to a specific area of packaging material suitable for packaging a product or a substance. In addition or in the alternative, stamping of the graphene or the graphene oxide in a size or shape other than a predetermined package outline can be followed by cutting of the stamped substrate for subsequent processing to form a packaging material having a desired or otherwise intended size and/or shape. In scenarios in which graphene oxide is transferred via stamping, or other thin film process(es), onto the second substrate in a roll-to-roll process, the transferred graphene oxide maybe reduced to graphene via, for example, low temperature sintering and/or annealing techniques within air or a reducing atmosphere.

As illustrated, the example process 500 includes block 540, at which a material (which may be referred to as coating material) is applied to the second substrate having the transferred graphene and/or graphene oxide. In certain implementations, applying the material can include laminating the material to the second substrate. The applied material can suitable for forming an outer member (e.g., outer member 110 or 310) or an inner member (e.g., inner member 130) of a solid packing material in accordance with one or more aspects of this disclosure. For instance, the applied material may be an aliphatic polyamide doped with amber-colored UV-block nanoparticles, such as tin oxide nanoparticles, zinc oxide nanoparticle, titanium dioxide nanoparticles, or other metal oxide nanoparticles. Other particles (e.g., rare-earth doped silica particles) and/or UV-blocking materials (e.g., translucent materials including iron oxide ($Fe_2O_3$), sulfur (S), and carbon (C)) also can be utilized or otherwise relied upon to dope the aliphatic polyamide.

At block 550, a packaging material can be supplied. The packaging material can be formed from the substrate, the graphene and/or the graphene oxide, and the coating material, each treated or otherwise processed according with the various blocks of the subject example process 500. For instance, the packaging material can be embodied in or can include a multi-member (which also may be referred to as multi-sheet) solid packaging material having a thermoplastic substrate, a graphene-based member, and a second thermoplastic material in accordance with this disclosure. More specifically, the packaging material can include three-sheet structures (see, e.g., FIGS. 1, 3, 4A, and 4B) or multi-sheet structures. In one implementation, supplying the packaging material can include cutting, punching out, or otherwise providing the manufactured packing material according to a specific dimension and/or shape requirements. While in certain embodiments, the packaging material can be supplied according to specification to serve as battery packaging, in other embodiments, the packaging material can be supplied for applications having specific dimension and/or shape requirements for packaging other than battery packaging.

Figure 6:
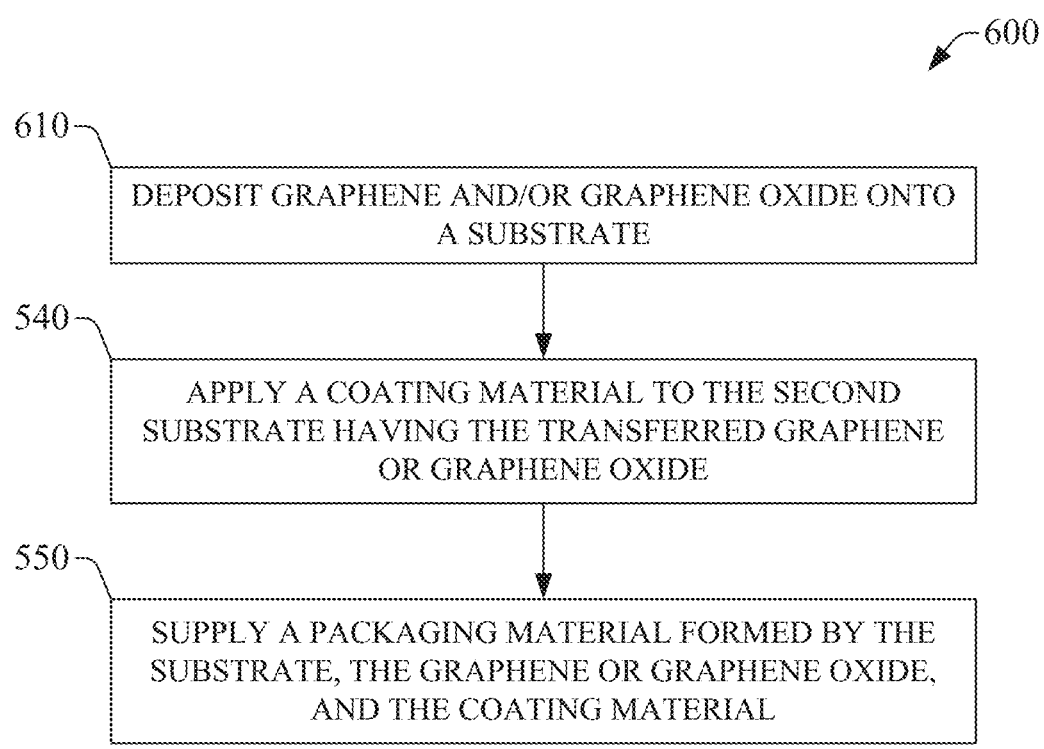

FIG. 6 illustrates another example process 600 for producing graphene-based packaging materials (which herein also may be referred to as graphene-based packaging assemblies) in accordance with one or more aspects of the disclosure. In the subject example process, graphene and/or graphene oxide can be formed directly onto a substrate at block 610. In one aspect, the substrate may be masked according to an intended or otherwise desired outline for the resulting packaging material. In addition, the substrate can be suitable for forming an outer member (e.g., outer member 110) or an inner member (e.g., inner member 130) of a graphene-based packaging material as described herein (see, e.g., FIGS. 1, 3, 4A, and 4B). In one example, the deposition block 610 can include depositing graphene oxide onto the substrate, and low-temperature processing for reduction of the deposited graphene oxide into graphene. As illustrated, after formation of a graphene oxide sheet, a graphene sheet, or a sheet combining graphene and graphene oxide, the example process 600 can include additional processing blocks similar to those in the example process 500 in order to form a graphene-based packaging material.

Figure 7:
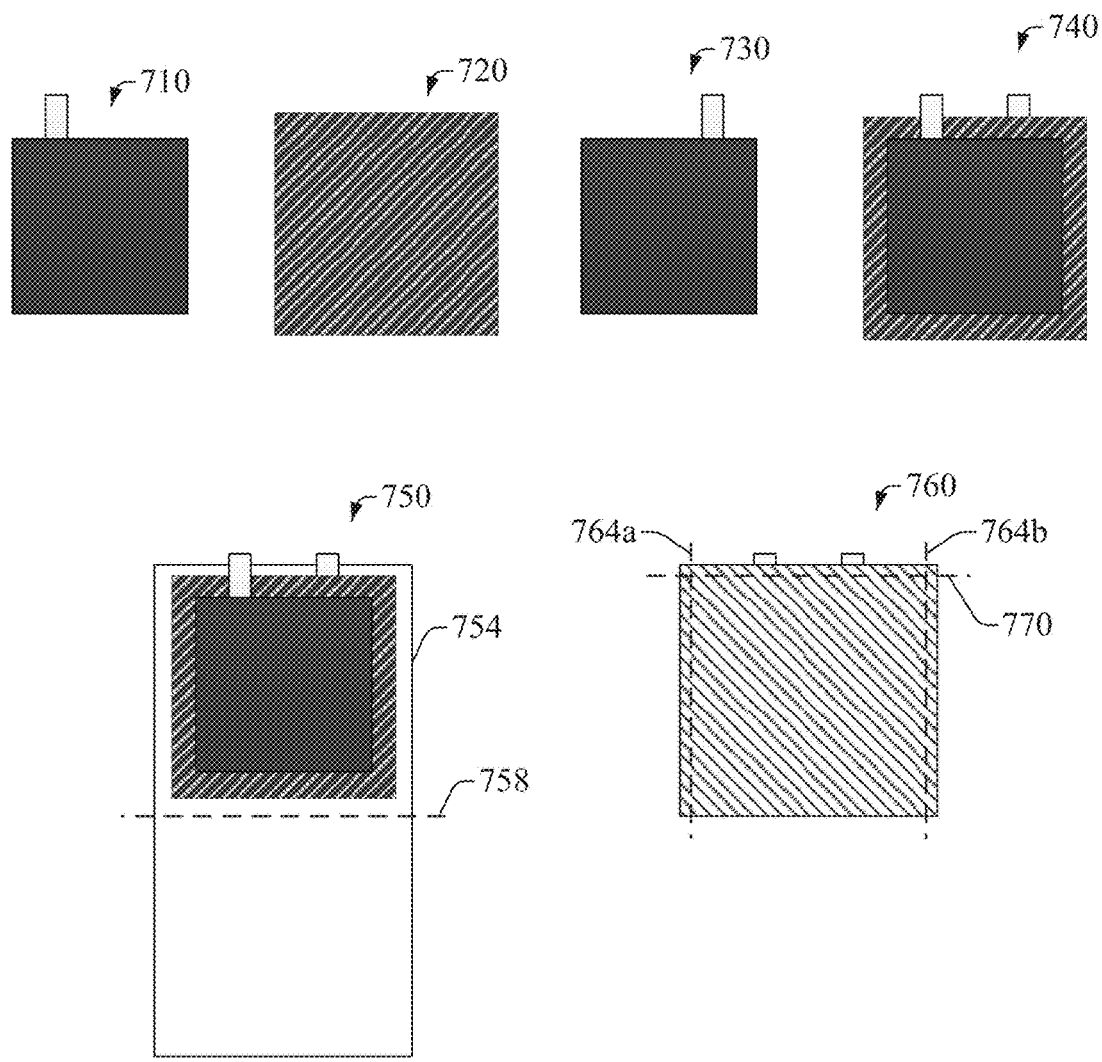
FIG. 7 illustrates an example of a battery packaging process in accordance with one or more aspects of the disclosure.

Implementation of the example process 500 or 600 can produce or otherwise form a layered graphene-based packing structure (e.g., a three member units, multiple three-member units, or structures formed from combinations of solid state sheets including graphene and/or graphene oxide sheets) for packaging in accordance with aspects of this disclosure. FIG. 7 illustrates the use of a graphene-based packaging assembly that can be formed via implementation of the example process 500 or 600. The packaging illustrated in FIG. 7 is simplified for the sake of clarity, and can be applied to any graphene-based packaging assemblies, such as multiple-stack graphene-based packaging assemblies (e.g., several three-member units as described herein), winding type battery cell configurations, and/or combinations thereof yielding unique battery cell shapes. As illustrated in FIG. 7, a cathode electrode 710 can be insulated from an anode electrode 730 via a separator layer 720. Such electrodes 710 and 730, and the separator layer 720 can form a battery electrode stack 740 having the separator layer 720 on top of anode electrode 730 and cathode electrode 710 on top of the separator layer 730. With reference to FIG. 1, for example, the battery electrode stack 740 can constitute the interior of the battery and can be enclosed or otherwise contained by a graphene-based packaging assembly 754 in accordance with aspects of the disclosure. More specifically, in at least certain aspects, the battery packaging material 754 can include a translucent polymer sheet disposed or otherwise assembled to be in contact with the exterior of a battery for a consumer electronics device; a translucent graphene sheet assembled to form a substantially planar interface with the translucent polymer sheet, the graphene sheet having a uniform or substantially uniform layer thickness in a range from about one atomic monolayer of graphene to about 100 atomic monolayers of graphene; and a translucent thermoplastic sheet assembled to form a second substantially planar interface with the graphene sheet, and further assembled to be in contact with the interior of the battery. As described herein, in one aspect, the translucent graphene sheet can mitigate mass transport and/or chemical coupling between the translucent polymer sheet and the translucent thermoplastic sheet for at least the desired shelf-life of a packaged content. It should be appreciated that the battery electrode stack 740 can be substantially in contact with the translucent thermoplastic sheet. As illustrated in packaging diagram 750, the graphene-based packaging assembly 754 may be folded upwards about a line 758 in order to enclose or otherwise contain the battery electrode stack 740. Further, as shown in diagram 760, the packaging material so folded can permit the folded portions of the translucent thermoplastic sheet of the packaging material to be in mutual, therefore permitting impulse sealing (via heat and/or pressure, for example) along the sides 764*a* and 764*b*. Such a sealing can define an opening in the proximity of the terminals of electrodes 710 and 730 for electrolyte infiltration, activation, and outgassing, and thus, formation of a functional battery. Upon or after electrolyte infiltration, activation, and outgassing, another impulse seal, with sealant adhesives, for example, for hermetic enclosure of the battery can be effected substantially along the side 770. As described herein, it can be appreciated that the translucent polymer sheet can form an outer surface available for protection and identification (e.g., label printing, agency markings, and/or other logistics). Further the presence of the translucent graphene sheet in the illustrated graphene-based packaging assembly can provide several of the efficiencies described herein.

Figure 8:
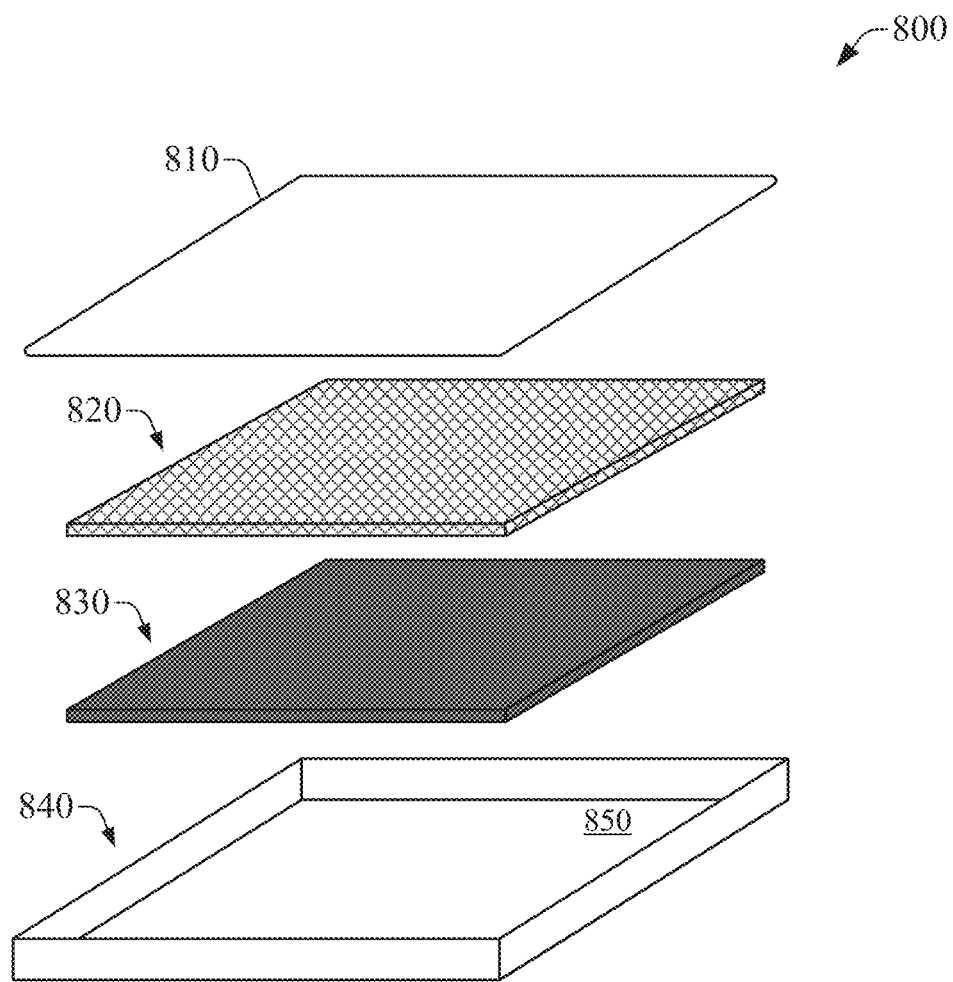
FIGS. 8-9 illustrate examples of electronic devices that include a battery that is packaged in accordance with one or more aspects of the disclosure.

FIG. 8 presents a schematic example of an electronic device 800 that can include a battery packaged in accordance with one or more aspects of the disclosure. The electronic device 800 can be embodied in a general purpose or special purpose computing device that may be autonomously powered, at least for a certain period, via the battery and/or a similar energy storage device. In one example, the electronic device 800 can be embodied in a portable personal computer or a handheld computing device, such as a mobile tablet computer, an electronic-book reader (also referred to as e-reader), a mobile telephone (e.g., a smartphone), and the like. In another example, the electronic device 800 can be embodied in a wearable computing device, such as watch, a pedometer, a biosensing wristband, goggles or head-mounted visors, or the like. In yet another example, the electronic device 800 can be embodied in portable consumer electronics equipment, such as a camera, a portable television set, a gaming console, a navigation device, a voice-over-internet-protocol telephone, a media playback device, or the like.

The electronic device 800 can include a screen or cover 810 that can permit viewing content displayed by electronic device 800. In addition, in certain embodiments, the cover 810 can permit other forms of interaction with an end-user, such as touch (e.g., swipes, taps, or the like) or other type of contact. The cover 810 can generally be formed from a transparent or substantially transparent material (e.g., a plastic, a glass, or the like).

The electronic device 800 also can include an electronics unit 820 having various electronics components and/or circuitry that can permit or otherwise facilitate specific functionality of the device. For example, the electronics unit 820 can include one or more processors, one or more input/output (I/O) interfaces, and/or one or more memory devices. In addition, the electronics unit 820 also can include a bus architecture that can functionally couple various electronic components within the electronics unit 820. In one example, the bus architecture can include at least one of a system bus, a memory bus, an address bus, or a message bus, and can permit the exchange of information (data, metadata, and/or signaling) between the one or more processors, the one or more I/O interfaces, and/or the one or more memory devices, or respective functional elements therein. In certain scenarios, the bus in conjunction with one or more internal programming interfaces, which may be retained in memory, can permit such exchange of information. In scenarios in which multiple processors are included in the electronics unit 820, the electronic device 800 can utilize or otherwise leverage parallel computing. In certain embodiments, the electronics unit 820 can be embodied in or can include a motherboard. While the electronics unit 820 is illustrated as a single block, it should be appreciated that it can be comprised of multiple sub-units that are functionally coupled to each other. Functional coupling can include, for example, communicative coupling, electrical coupling, thermal coupling, mechanical coupling, couplings according to a combination of the foregoing, or the like.

In certain embodiments, the electronics unit 820 can include, optionally, a radio unit having one or more antennas and a communication processing unit that can permit wireless communication between the electronic device 800 and other devices, such as a remote computing device and/or a remote sensor. Further, in certain embodiments, the electronics unit 820 can include one or more sensors that can permit or otherwise facilitate certain functionality of the electronic device 800, such as navigation, biometric sensing, a combination thereof, or the like. For instance, the one or more sensors can include inertial sensor(s) (e.g., accelerometers, gyroscopes, etc.), magnetic sensor(s) (e.g., a three-axis magnetometer), biometric sensor(s), a combination thereof, or the like.

At least one of the one or more I/O interfaces that may be included in the electronics unit 820 can permit communication of information between the electronic device 800 and an external device, such as another computing device (e.g., a network element or an end-user device). Such communication can include direct communication or indirect communication, such as the exchange of information between the electronic device 800 and the external device via a network or elements thereof. In at least certain embodiments, such as the electronic device 904 in accordance with an embodiment of the disclosure, shown in FIG. 9, the one or more I/O interfaces can include one or more of network adapter(s), peripheral adapter(s), and/or rendering unit(s). Such adapter(s) can permit or otherwise facilitate connectivity between the external device and at least one of the one or more processors or the one or more memory devices that can be present in the electronics unit 820. Further, at least one of the one or more I/O interfaces included in the electronics unit 820 can permit, via a rendering unit, for example, output of information from the electronic device 800. At least a portion of such information can be generated at the electronic device 800 or a remote computing device functionally coupled to the electronic device 800. Such output can be any form of visual representation of the information, including textual, graphical, animation, audio, tactile, haptic, and the like. In addition or in the alternative, depending on the architectural complexity of the electronic device 800, the at least one of the one or more I/O interfaces can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the electronic device 800, or can permit conveying or revealing the operational conditions of the electronic device 800.

In one aspect, the bus architecture included in the electronics unit 820 can represent one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The electronics unit 820 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the electronic device 800, and can comprise, for example, both volatile and non-volatile media, and removable and/or non-removable media. In one aspect, the one or memory devices included in the electronics unit 820 can include computer-readable media in the form of volatile memory, such as random access memory (RAM), and/or non-volatile memory, such as read-only memory (ROM).

The one or more memory devices that can be contained within the electronics unit 820 can include computer-accessible instructions that, in response to execution (by at least one of the one or more processors included in the electronics unit 820, for example), can implement one or more of the functionalities (e.g., telecommunication, media display or playback, biometric sensing, navigation, a combination thereof, or the like) of the electronic device 800. The computer-accessible instructions can embody or can comprise one or more software components (not shown). In one scenario, execution of at least one of such component(s) can implement one or more of the functionalities of the electronic device 800. The one or more computer-accessible instructions can be persisted (e.g., stored, made available, or stored and made available) in a computer storage non-transitory medium contained in the memory and can be executed by at least one of the one or more processors contained within the electronics unit 820. The one or more computer-accessible instructions that embody a software component can be assembled into one or more program modules, for example, that can be compiled, linked, and/or executed at the electronic device 800. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the electronic device 800 or functionally coupled thereto.

The electronic device 800 can include a battery 830 or other type of power supply, which can power components or functional elements within the electronic device 800. The battery 830 can be rechargeable, and can be formed by stacking active elements (e.g., cathode, anode, separator material, and electrolyte) or a winding a multi-layered roll of such elements. In addition, the battery 830 can be embodied in a battery in accordance with one or more embodiments of the disclosure. More specifically, the battery 830 can be packaged with a graphene-based packaging material in accordance with one or more aspects of this disclosure. The battery 830 can be functionally coupled (e.g., electrically and/or mechanically coupled) to the electronics unit 820. In certain embodiments, the battery 830 can include an anode; a cathode; a separator material that separates the anode and cathode; an electrolyte; and a graphene-based packaging material that encloses the anode, the cathode, and the electrolyte. In one example, the graphene-based packaging material can include a translucent polymer sheet having an upper surface and a lower surface opposite to the upper surface. The graphene-based packaging material also can include a translucent graphene sheet (also referred to as a translucent graphene film) having a surface in contact with the lower surface of the translucent polymer sheet. In addition, the graphene-based packaging material can include and a translucent thermoplastic sheet having an upper surface in contact with a second surface of the translucent graphene sheet and a lower surface opposite to the upper surface, the lower surface is in contact with the electrolyte. In one aspect, the translucent graphene sheet can mitigate mass transport or diffusion of one or more of hydrogen, oxygen, water, or a particulate from the translucent polymer sheet to the translucent thermoplastic sheet. In certain embodiments, the translucent polymer sheet comprises an aliphatic polyamide, and the translucent thermoplastic sheet comprises at least one of polypropylene, polyethylene, polyurethane, or polyethylene terephthalate. In other embodiments, the translucent polymer sheet comprises an aliphatic polyamide and a material that absorbs electromagnetic radiation in the ultraviolet portion of the electromagnetic radiation spectrum. In addition, in certain embodiments of the battery 830, the translucent graphene sheet can have an optical transmittance ranging from about 10% to about 90% for electromagnetic radiation wavelengths in the range from about 400 nm to about 800 nm. In one aspect, such optical transmittance can be independent or substantially independent of position within the translucent graphene sheet. In other embodiments, the translucent graphene sheet can have a uniform or substantially uniform thickness of about 10 atomic monolayers of graphene. As described herein, a uniform thickness refers to a thickness that is independent of the position at which the thickness is determined or otherwise probed. In addition, the translucent graphene sheet can have an optical transmittance of about 85% for electromagnetic radiation wavelengths in the range from about 400 nm to about 800 nm. Such optical transmittance can be independent or substantially independent of position within the translucent graphene sheet. Therefore, the optical transmittance of the translucent graphene sheet may be referred to as being uniform or substantially uniform. In yet other embodiments, the translucent graphene sheet can have a substantially uniform layer in a range from about 1 Ångstrom to about 400 Ångstrom.

In addition, the electronic device 800 also can include a housing 840 that can enclose or otherwise contain the battery 830 and the electronics unit 820. The housing 840 also can be configured (e.g., sized and/or otherwise suitably manufactured) to receive the cover 810 and formed a closed device embedding the electronics unit 820 and the battery 830. In one aspect, the housing 840 can have a surface 850 that can be, at least in part, transparent or translucent. As such, the surface 850 can be formed from a transparent material, such as a transparent glass or plastic, or can define an opening (not depicted) into the interior of the electronic device 800. The transparency of at least a portion of the surface 850 and/or the opening that it may define can permit visually inspecting at least a portion of the battery 830. Based on the translucency of the graphene-based packaging material enclosing the battery 830, such a visual inspection can permit an assessment of the condition of the battery 830. For example, identification of changes in coloration of the battery 830 can indicate, either qualitatively or semi-quantitatively, (i) degradation of one or more elements (e.g., anode, cathode, or electrolyte) of the battery 830 or (ii) operation of the battery or an electronic device including the battery outside an intended or otherwise normal range of temperatures. For another example, observation of gas (such as bubbles) within the battery 830 or identification of uniform or non-uniform morphological changes in the battery 830 also can indicate degradation of one or more elements of the battery 830. In one example, the morphological changes can include formation of corroded regions, appearance of porous regions, deformation of a portion of the battery 830, a combination thereof, or the like. The one or more elements of the battery 830 can include an anode, a cathode, a separator material, and/or an electrolyte.

In addition or in the alternative, the transparency of at least a portion of the surface 850 can impart unique and/or stunning aesthetic features to the electronic device 800 by exposing at least a portion of the battery 830, which can be translucent and/or colored as described herein.

Figure 9:
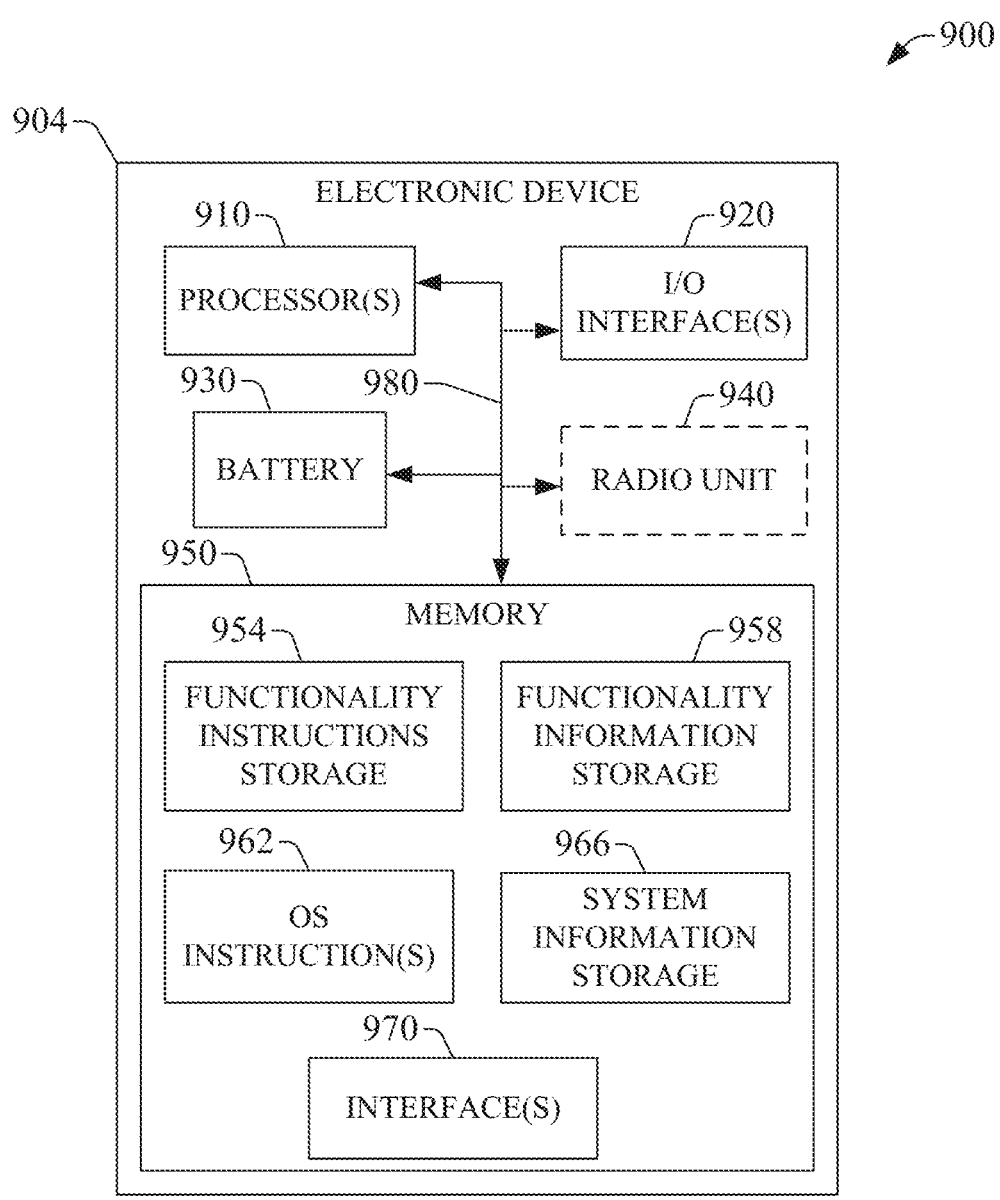

FIG. 9 illustrates another example of an electronic device 904 that can include a battery that is packaged with a graphene-based battery packaging in accordance with one or more aspects of the disclosure. The electronic device 904 can be embodied in a general purpose or special purpose computing device that may be autonomously powered, at least for a certain period, via such a battery and/or a similar energy storage device. In one example, the electronic device 904 can be embodied in a portable personal computer or a handheld computing device, such as a mobile tablet computer, an electronic-book reader (also referred to as an e-reader), a mobile telephone (e.g., a smartphone), and the like. In another example, the electronic device 904 can be embodied in a wearable computing device, such as a watch, a pedometer, a biosensing wristband, goggles or head-mounted visors, or the like. In yet another example, the electronic device 904 can be embodied in portable consumer electronics equipment, such as a camera, a portable television set, a gaming console, a navigation device, a voice-over-internet-protocol telephone, a media playback device, or the like.

As illustrated, the electronic device 904 can include one or more processors 910, one or more I/O interfaces 920, a battery 930, one or more memory devices 950 (referred to as memory 950), and a bus architecture 980 (also referred to as bus 980) that can functionally couple various functional elements of the electronic device 904. In certain embodiments, the electronic device 904 can include, optionally, a radio unit 940. The radio unit 940 can include one or more antennas and a communication processing unit that can permit wireless communication between the electronic device 904 and another device, such as a remote computing device and/or a remote sensor. In addition, while not illustrated, in certain embodiments, the electronic device 904 can include one or more sensors that can permit certain functionality of the electronic device 904, such as navigation, biometric sensing, a combination thereof, or the like. For instance, the one or more sensors can include inertial sensor(s), magnetic sensor(s), biometric sensor(s), a combination thereof, or the like. The bus 980 can include at least one of a system bus, a memory bus, an address bus, or a message bus, and can permit the exchange of information (data, metadata, and/or signaling) between the processor(s) 910, the I/O interface(s) 920, and/or the memory 950, or respective functional elements therein. In certain scenarios, the bus 980 in conjunction with one or more internal programming interfaces 970 (also referred to as interface(s) 970) can permit such exchange of information. In scenarios in which the processor(s) 910 include multiple processors, the electronic device 904 can utilize or otherwise leverage parallel computing.

The I/O interface(s) 920 can permit functionally coupling (e.g., communicatively coupling) the electronic device 904 with an external device, such as another computing device (e.g., a network element or an end-user device). In one example, the I/O interface(s) 920 can permit or otherwise facilitate tethering the electronic device 904 to the external device. Such a functional coupling can permit communication between the electronic device 904 and the external device. The communication can include direct communication or indirect communication, such as the exchange of information between the electronic device 904 and the external device via a network or elements thereof. In at least certain embodiments, the I/O interface(s) 920 can include network adapter(s), peripheral adapter(s), and/or rendering unit(s). Such adapter(s) can permit or otherwise facilitate connectivity between the external device and at least one of the processor(s) 910, the memory 950, and/or the radio unit 940 (when present). For example, the peripheral adapter(s) can include one or more of ports, which can include at least one of parallel ports, serial ports, Ethernet ports, V.35 ports, or X.21 ports. In certain embodiments, the parallel ports can include General Purpose Interface Bus (GPIB) ports and/or IEEE-1284 ports, and the serial ports can include Recommended Standard (RS-232) ports, V.11 ports, USB ports, FireWire and/or IEEE-1394 ports.

In one aspect, at least one of the I/O interface(s) 920 can functionally couple, via a network adapter, for example, the electronic device 904 to one or more remote computing devices or sensors (not depicted in FIG. 9). To at least such an end, the at least one of the I/O interface(s) 920 can utilize or otherwise leverage one or more traffic and signaling pipes that can permit or otherwise facilitate the exchange of traffic and/or signaling between the electronic device 904 and the one or more remote computing devices or sensors. Such network coupling provided at least in part by the at least one of the I/O interface(s) 920 can be implemented in a wired environment, a wireless environment, or both. The information that is communicated by the at least one of the I/O interface(s) 920 can result from the implementation of certain functionality (telecommunication, media display or playback, navigation, biometric sensing, and the like) of the electronic device 904.

Further, at least one of the I/O interface(s) 920 can permit, via a rendering unit, for example, output of information from the electronic device 904. The rendering unit can be embodied in or can include a display device, an audio speaker, a haptic device, a combination thereof, or the like. At least a portion of such information can be generated at the electronic device 904 or a remote computing device functionally coupled to the electronic device 904. Such output can be any form of visual representation of the information, including textual, graphical, animation, audio, haptic, and the like. In addition or in the alternative, depending on the architectural complexity of the electronic device 904, the at least one of the I/O interface(s) 920 can include functional elements (e.g., lights, such as light-emitting diodes; a display device, such as an LCD, a plasma monitor, an LED monitor, or an electrochromic monitor; combinations thereof; or the like) that can permit control of the operation of the electronic device 904, or can permit conveying or revealing the operational conditions of the electronic device 904.

In one aspect, the bus 980 can represent one or more of several possible types of bus structures, including a memory bus or a memory controller, a peripheral bus, an accelerated graphics port, and a processor or local bus using any of a variety of bus architectures. As an illustration, such architectures can comprise an ISA bus, a MCA bus, an EISA bus, a VESA local bus, an AGP bus, a PCI bus, a PCI-Express bus, a PCMCIA bus, a USB, and the like.

The electronic device 904 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the electronic device 904, and can comprise, for example, both volatile and non-volatile media, and removable and/or non-removable media. In one aspect, the memory 950 can include computer-readable media in the form of volatile memory, such as RAM, and/or non-volatile memory, such as ROM.

The memory 950 can include functionality instructions storage 954 and functionality information storage 958. In certain embodiments, one or more of the functionality instructions storage 954 and the functionality information storage 958 can be embodied in or can comprise removable/non-removable, and/or volatile/non-volatile computer storage media. The functionality instructions storage 954 can include computer-accessible instructions including computer-readable and/or computer-executable instructions. In response to execution (by at least one of the processor(s) 910, for example), the computer-accessible instructions can implement one or more of the functionalities of the electronic device 904. Such functionalities can include, for example, telecommunication, media display or playback, biometric sensing, navigation, a combination thereof, or the like. The computer-accessible instructions can embody or can comprise one or more software components (not depicted). As such, in one scenario, execution of at least one of such component(s) can implement one or more of the functionalities of the electronic device 904. A processor of the processor(s) 910 that executes at least one of the software component(s) can retrieve information from and/or retain information in one or more memory elements in the functionality information storage 958 in accordance with the functionality programmed or otherwise configured by the software component(s). The one or more memory elements within the functionality information storage 958 can include at least one of code instructions, information structures, or the like.

At least the portion of the computer-accessible instructions included in the memory 950 can be stored in a non-transitory computer storage medium contained in the memory 950 and can be executed by at least one of the processor(s) 910. In one example, the functionality instruction(s) storage 954 can embody a non-transitory computer-readable storage medium having computer-accessible instructions that, in response to execution, cause at least one processor (e.g., one or more of the processor(s) 910) to perform a group of operations associated with specific functionality of the electronic device 904. In addition, the one or more computer-accessible instructions that embody a software component can be assembled into one or more program modules, for example, that can be compiled, linked, and/or executed at the electronic device 904 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the electronic device 904 or functionally coupled thereto.

At least one of the one or more interfaces 970 (e.g., application programming interface(s)) can permit or facilitate communication of information between two or more components within the functionality instructions storage 954. The information that is communicated by the at least one interface can result from implementation (e.g., execution) of one or more operations associated with a functionality of the electronic device 904. For example, two or more software components in the functionality instructions storage 954 that are being executed can exchange information via the at least one of the interface(s) 970.

It should be recognized that while the functionality instructions storage 954 and other executable program components, such as the OS instruction(s) 962, are illustrated herein as discrete blocks, such software components can reside at various times in different memory components of the electronic device 904, and can be executed by at least one of the processor(s) 910.

In addition, the memory 950 can comprise computer-accessible instructions and information (e.g., data, metadata, and/or programming code instructions) that permit or otherwise facilitate the operation and/or administration (e.g., upgrades, software installation, any other configuration, or the like) of the electronic device 904. Accordingly, as illustrated, the memory 950 can comprise a memory element 962 (labeled operating system (OS) instruction(s) 962) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the electronic device 904 can dictate a suitable OS. The memory 950 also can include a system information storage 966 having data, metadata, and/or instructions (e.g., programming code) that can permit or otherwise facilitate the operation and/or administration of the electronic device 904. Elements of the OS instruction(s) 962 and the system information storage 966 can be accessible or can be operated on by at least one of the processor(s) 910.

As described herein, the electronic device 904 can include a battery 930 that can power components or functional elements within the electronic device 904. The battery 930 can be rechargeable, and can be formed by stacking active elements (e.g., cathode, anode, separator material, and electrolyte) or a winding a multi-layered roll of such elements. In addition, the battery 930 can include a graphene-based battery packaging material in accordance with one or more embodiments of this disclosure. More specifically, the battery 930 can be packaged with a graphene-based packaging material in accordance with one or more aspects of this disclosure. In certain embodiments, the battery 930 can include an anode; a cathode; an electrolyte; and a graphene-based packaging material enclosing the anode, the cathode, and the electrolyte. In one example, the graphene-based packaging material can include a translucent polymer sheet having an upper surface and a lower surface opposite to the upper surface. The graphene-based packaging material also can include a translucent graphene sheet having a surface in contact with the lower surface of the translucent polymer sheet. In addition, the graphene-based packaging material can include a translucent thermoplastic sheet having an upper surface in contact with a second surface of the translucent graphene sheet and a lower surface opposite to the upper surface, where the lower surface is in contact with the electrolyte. In one aspect, the translucent graphene sheet can mitigate mass transport or diffusion of one or more of hydrogen, oxygen, water, or a particulate from the translucent polymer sheet to the translucent thermoplastic sheet. In certain embodiments, the translucent polymer sheet can include an aliphatic polyamide, and the translucent thermoplastic sheet can include at least one of polypropylene, polyethylene, polyurethane, or polyethylene terephthalate. In other embodiments, the translucent polymer sheet can included an aliphatic polyamide and a material that absorbs electromagnetic radiation in the ultraviolet portion of the electromagnetic radiation spectrum. In addition, in certain embodiments of the battery 930, the translucent graphene sheet can have a substantially uniform optical transmittance ranging from about 10% to about 90% for electromagnetic radiation wavelengths in the range from about 400 nm to about 800 nm. In other embodiments, the translucent graphene sheet can have a substantially uniform thickness of about 10 atomic monolayers of graphene. In addition, the translucent graphene sheet can have a substantially uniform optical transmittance of about 85% for electromagnetic radiation wavelengths in the range from about 400 nm to about 800 nm. In yet other embodiments, the translucent graphene sheet can have a substantially uniform layer in a range from about 1 Ångstrom to about 400 Ångstrom. The translucent graphene sheet also may be referred to as a translucent graphene film.

In addition to the battery 930, the electronic device 904 can include one or more transformers (not depicted) and/or other circuitry (not depicted) to achieve a power level suitable for the operation of the electronic device 904 and components, functional elements, and related circuitry therein. In certain scenarios, the electronic device 904 can be attached to a conventional power grid to recharge the battery 930 and ensure that the electronic device 904 and the functional elements therein can be operational. In one aspect, at least one of I/O interface(s) 920 can permit connecting to the conventional power grid. In certain embodiments, the electronic device 904 can include an energy conversion component, such as a solar panel, to provide additional or alternative power resources or power autonomy to the electronic device 904.

It should be appreciated that, in certain embodiments, the electronic device 904 can operate in a networked environment by utilizing connections to one or more remote computing devices and/or sensors (not depicted in FIG. 9). As an illustration, a remote computing device can be a personal computer, a portable computer, a server, a router, a network computer, a peer device or other common network node, and so on. As described herein, connections (physical and/or logical) between the electronic device 904 and a remote computing device or sensor can be made via one or more traffic and signaling pipes, which can comprise wired link(s) and/or wireless link(s) and several network elements (such as routers or switches, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, at least some of functionality of the electronic device 904 can be practiced in distributed computing environments, such as grid-based environments, where tasks can be performed by remote processing devices (e.g., network servers) that are functionally coupled (e.g., communicatively linked or otherwise coupled) through a network having traffic and signaling pipes and related network elements. In a distributed computing environment, in one aspect, one or more software components (such as program modules) that permit or otherwise facilitate the functionality of the electronic device 904 may be located in both the electronic device 904 and at least one remote computing device.

While various aspects of the disclosure have been described in connection with packaging of batteries, the disclosure is not so limited and the graphene-based packaging materials described herein can be utilized or otherwise leveraged for packaging other substances or products, such as foodstuffs; medicines; electronic components; samples or specimens, such as those containing nanoparticles; and so forth. More generally, the graphene-based packaging materials described herein can be applied in packaging of most any product or substance that may be susceptible to degradation when exposed to the exterior of the packaging containing the product or substance. The graphene sheet or graphene oxide sheet included in the graphene-based packaging material can permit substantive isolation (e.g., lack of diffusion of oxygen and/or moisture) between of the interior and the exterior of a package formed from such a packaging material. As such, in one aspect, the graphene-based packaging material of the disclosure can mitigate or avoid degradation of a packaged product or substance.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like. In addition, it is to be understood and appreciated that not all illustrated actions may be required to implement a protocol, procedure, process, or method in accordance with one or more aspects of this disclosure.

As utilized in this application, the terms "component," "system," "architecture," "I/O interface" (or terms referring to other computing device interfaces), "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). A computing device interface can include input/output (I/O) components as well as associated processor, application, and/or other programming components. The terms "component," "system," "architecture," "I/O interface" (or terms referring to other computing device interfaces), "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "memory" and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include ROM, programmable ROM (PROM), electrically programmable ROM (EPROM), electrically erasable programmable ROM (EEPROM), or flash memory. Volatile memory can include RAM, which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of embodiments of graphene-based battery packaging materials, processes to produce the same, and devices having batteries packaged with such materials in accordance with one or more aspects of this disclosure. It is, of course, not possible to describe every conceivable combination of elements and/or methodologies for purposes of describing the various features of the disclosure, but one of ordinary skill in the art can recognize that many further combinations and permutations of the claimed subject matter are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A battery, comprising:
an outer member comprising a translucent polymer film, the outer member having an upper surface and a lower surface opposite to the upper surface;
a translucent graphene-based member having a first surface and a second surface opposite to the first surface, the first surface being in contact with the lower surface of the outer member; and an inner member comprising a translucent thermoplastic film, the inner member having an upper surface in contact with the second surface of the translucent graphene-based member and a lower surface opposite to the upper surface of the inner member, wherein the translucent polymer film has a first melting point and a first mechanical strength, and the translucent thermoplastic film has a second melting point and a second mechanical strength, the first melting point being higher than the second melting point and the first mechanical strength being higher than the second mechanical strength.

2. The battery of claim 1, wherein the translucent graphene-based member has an optical transmittance ranging from about 10% to about 90% for electromagnetic radiation wavelengths in a range from about 400 nm to about 800 nm.

3. The battery of claim 1, wherein the translucent graphene-based member has a thickness of about 10 atomic monolayers of graphene, and wherein the translucent graphene-based member has an optical transmittance of about 85% for electromagnetic radiation wavelengths in a range from about 400 nm to about 800 nm.

4. The battery of claim 1, wherein the translucent graphene-based member comprises a film having a thickness in a range from about 1 Ångstrom to about 400 Angstrom.

5. The battery of claim 1, wherein the translucent graphene-based member comprises a graphene film having a thickness in a range from about one atomic monolayer of graphene to about 100 atomic monolayers of graphene.

6. The battery of claim 1, wherein the translucent graphene-based member comprises one or more of a translucent graphene film or a translucent graphene oxide film.

7. The battery of claim 1, wherein the translucent thermoplastic film comprises one or more of a thin acrylic film, a thin vinyl film, a polyester film, a biaxially-oriented polyethylene terephthalate film, a biaxially-oriented polypropylene film, or a polyether ether ketone film.

8. The battery of claim 1, wherein the translucent polymer film comprises one or more of an aliphatic polyamide or a material that absorbs electromagnetic radiation in an ultraviolet portion of an electromagnetic radiation spectrum.

9. The battery of claim 1, wherein the translucent polymer film comprises a plastic and a material that absorbs electromagnetic radiation in an ultraviolet portion of an electromagnetic radiation spectrum.

10. The battery of claim 1, wherein the translucent polymer film comprises one or more of a material that absorbs electromagnetic radiation in an ultraviolet portion of an electromagnetic radiation spectrum, a photochromic material, or a thermochromic material.

11. An electronic device, comprising:
one or more memory devices;
one or more processors coupled to the one or more memory devices; and
a battery coupled to at least the one or more memory devices and the one or more processors, the battery comprising:
an outer member comprising a translucent polymer film, the outer member having an upper surface and a lower surface opposite to the upper surface,
a translucent graphene-based member having a first surface and a second surface opposite to the first surface, the first surface being in contact with the lower surface of the outer member, and
an inner member comprising a translucent thermoplastic film, the inner member having an upper surface in contact with the second surface of the translucent graphene-based member and a lower surface opposite to the upper surface of the inner member, wherein the translucent polymer film has a first melting point and a first mechanical strength, and the translucent thermoplastic film has a second melting point and a second mechanical strength, the first melting point being higher than the second melting point and the first mechanical strength being higher than the second mechanical strength.

12. The electronic device of claim 11, wherein the translucent graphene-based member has an optical transmittance ranging from about 10% to about 90% for electromagnetic radiation wavelengths in a range from about 400 nm to about 800 nm.

13. The electronic device of claim 11, wherein the translucent graphene-based member has a thickness of about 10 atomic monolayers of graphene, and wherein the translucent graphene-based member has an optical transmittance of about 85% for electromagnetic radiation wavelengths in a range from about 400 nm to about 800 nm.

14. The electronic device of claim 11, wherein the translucent graphene-based member comprises a film having a thickness in a range from about 1 Ångstrom to about 400 Ångstrom.

15. The electronic device of claim 11, wherein the translucent graphene-based member comprises a graphene film having a thickness in a range from about one atomic monolayer of graphene to about 100 atomic monolayers of graphene.

16. The electronic device of claim 11, wherein the translucent graphene-based member comprises one or more of a translucent graphene film or a translucent graphene oxide film.

17. The electronic device of claim 11, wherein the translucent thermoplastic film comprises one or more of a thin acrylic film, a thin vinyl film, a polyester film, a biaxially-oriented polyethylene terephthalate film, a biaxially-oriented polypropylene film, or a polyether ether ketone film.

18. A package, comprising:
a first translucent thermoplastic film having a first surface;
a translucent graphene-based film having a first surface and a second surface opposite to the first surface, the first surface being in contact with at least a portion of the first surface of the first translucent polymer film; and
a second translucent thermoplastic film having a first surface in contact with at least a portion of the second surface of the translucent graphene-based film;
wherein the first translucent thermoplastic film has a first melting point and a first mechanical strength, and the second translucent thermoplastic film has a second melting point and a second mechanical strength, the first melting point being higher than the second melting point and the first mechanical strength being higher than the second mechanical strength.

19. The package of claim 18, wherein the translucent graphene-based member has an optical transmittance ranging from about 10% to about 90% for electromagnetic radiation wavelengths in a range from about 400 nm to about 800 nm.

20. The package of claim 18, wherein the translucent graphene-based member has a thickness of about 10 atomic monolayers of graphene, and wherein the translucent graphene-based member has an optical transmittance of about 85% for electromagnetic radiation wavelengths in a range from about 400 nm to about 800 nm.

* * * * *